July 30, 1940.  H. J. HOUTSINGER ET AL  2,209,522
ANIMAL TRAP
Filed Sept. 28, 1938  2 Sheets-Sheet 2
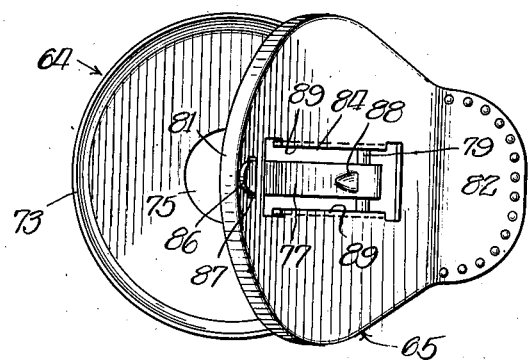
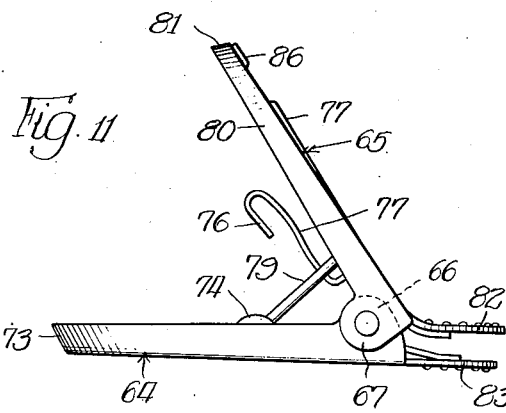
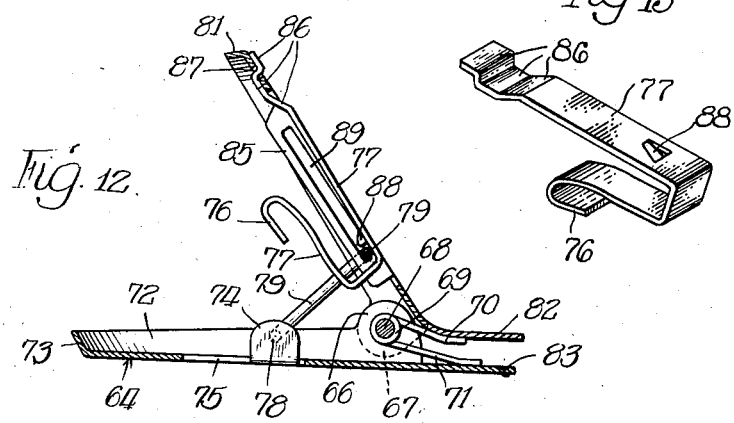
INVENTORS.
Henry J. Houtsinger,
BY  Herbert A. Stilson,
Harvey L. Hanson
ATTORNEY.

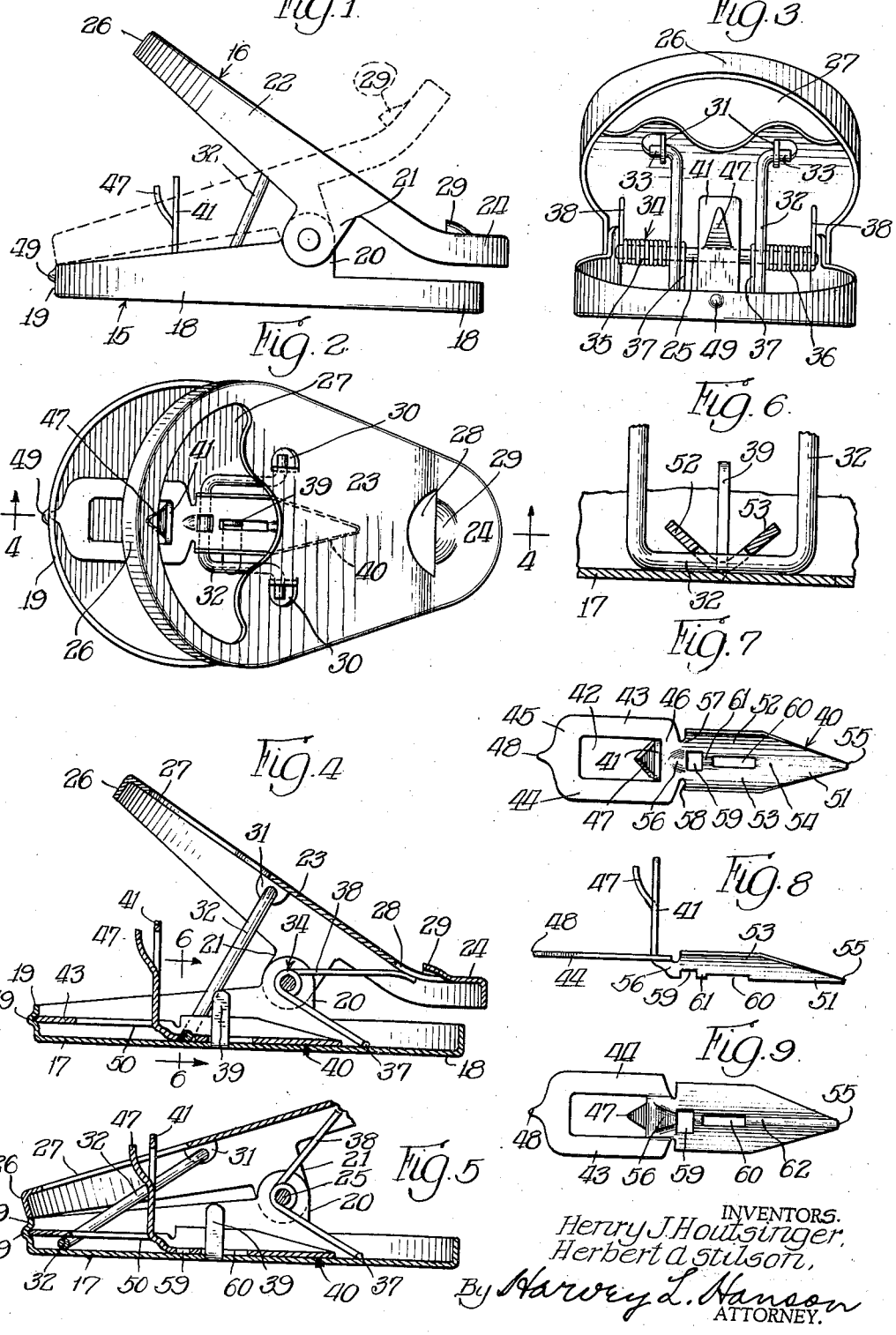

Patented July 30, 1940

2,209,522

UNITED STATES PATENT OFFICE 2,209,522

ANIMAL TRAP

Henry J. Houtsinger and Herbert A. Stilson, Chicago, Ill., assignors to McGill Metal Products Company, Chicago, Ill., a corporation of Illinois Application September 28, 1938, Serial No. 232,052

16 Claims. (Cl. 43—83)

The invention relates to animal traps and particularly to traps for trapping and catching small animals and especially mice.

An object of the invention is to provide a construction of trap which in a preferred embodiment and in a modified embodiment is preferably of metal throughout and is very inexpensive to manufacture and assemble, and may be set in position and operated in a very efficient manner. To accomplish these purposes the parts of both the preferred and modified forms of the trap are few in number, are readily assembled, may be set in trapping position and may be readily releasable so that the slightest touch of the mechanism of the trap causes the trap to spring and operate.

An important object of the invention is to construct the preferred form of trap with a combined bait holder, treadle and trigger formed preferably from a metal stamping of a single unitary blank which is perforated, bent, formed up and connected to perform its various functions and duties in a proper and highly efficient manner.

Another important object of the invention is to construct the combined bait holder, treadle and trigger so that it is loosely held in place and may readily move up and down and also may rock or swing from one side to the other within the casing or shell of the trap.

It is another object of the invention to construct the trap with a sliding yoke or latch which cooperates with the rocking treadle, bait holder and trigger and the jaws of the trap so that the spring associated with the jaws closes the jaws instantaneously and effectively when the rocking treadle is caused to move either up or down or to one side or the other.

In the two forms of trap the sliding yoke or latch permits the jaws of the trap to spring together, although in one case, the sliding yoke slides along the bottom portion of the trap and in the other case the sliding yoke slides along the upper portion of the trap.

Further objects and advantages of the invention will be readily apparent and more fully described in connection with the following description taken with the accompanying drawings showing the two embodiments of the invention which have been referred to, but it will be understood that changes may be made in the parts and details of the two constructions without departing from the spirit of the invention, and we therefore do not limit ourselves to the exact construction shown and described, but in the claims hereinafter set forth we intend to cover all modifications and variations of the invention.

In the drawings:

Figures 1 to 9 inclusive, illustrate the preferred embodiment of the invention, while Figures 10 to 12 inclusive, illustrate the modified form of the invention.

Figure 1 is a side elevational veiw of the preferred form of trap and in the full lines shows the jaws of the trap open, while the dotted lines illustrate one jaw of the trap in closed or operative position.

Figure 2 is a top plan view of the preferred form of trap and illustrates the jaws in open position with a top plan view of the combined rocking treadle, bait holder and trigger assembled with the sliding yoke or latch.

Figure 3 is a front elevational view of the preferred form of trap showing the jaws in open position and illustrating the front view of the bait holder, sliding yoke and operating spring of the trap and showing the sliding yoke slidable on the lower jaw of the trap.

Figure 4 is a cross sectional view on the line 4—4 of Figure 2, and illustrates the trap with its jaws open, a cross sectional view of the combined rocking treadle and bait holder and the sliding yoke or latch holding the jaws of the trap apart and with the spring ready to close the jaws of the trap on release of the sliding yoke or latch.

Figure 5 is a cross sectional view of the trap with the jaws closed, they having been sprung by the release of the sliding yoke of the trap, and shows the combined rocking treadle and bait holder and the spring in the position taken when the jaws of the trap are closed and showing the sliding yoke slidable on the lower jaw of the trap.

Figure 6 is an enlarged front elevational view of the lower end of the sliding yoke and also shows a portion of the combined rocking treadle and bait holder and is taken on the line 6—6 of Figure 4.

Figure 7 is a top plan view of the combined rocking treadle, bait holder and trigger which is part of the assembly of the preferred form of trap.

Figure 8 is a side elevational view of the combined rocking treadle, bait holder and trigger.

Figure 9 is a bottom plan view of the combined rocking treadle, bait holder and trigger illustrated in Figures 7 and 8 and also in the other figures of the drawing.

Figure 10 is a top plan view of the modified form or embodiment of the invention and shows the trap with its jaws in open position and with the sliding yoke slidable on the upper jaw of the trap.

Figure 11 is a side elevational view of the modified form of trap and shows the jaws thereof in open position, and also shows the sliding yoke extending to the top jaw and the bait holder extending from the top jaw of the trap.

Figure 12 is a view, partly in side elevation and partly in cross section, of the modified form of trap and illustrates the jaws of the trap in open position, the upper jaw being held open by the sliding yoke, and also illustrates in a side view, the pathway of the upper part of the sliding yoke.

Fig. 13 is a detail view of the trigger 77.

In the preferred embodiment of the invention which is illustrated in the drawings in Figures 1 to 9 inclusive, two jaw members are employed. The lower jaw is numbered 15 and the upper, 16. These jaw members are preferably of metal and have egg or pear shapes being narrow at the handle end of the trap and being wide and semicircular at the jaw end of the trap. The configuration of the trap is best shown in Figure 2 of the drawings, but it will be understood that we are not limited to a trap having the contour and configurations shown.

The lower jaw member is provided with the base portion 17 and has the upwardly extending integral wall section 18. The wall 18 extends about the entire perimeter of the base 17. The front portion of the upwardly extending wall 18 constitutes the lower biting or imprisoning jaw 19 of the trap. The wall 18 of the lower portion of the trap is provided with a pair of upwardly extending ears 20. These ears are apertured and the apertures register with similar apertures in the pair of ears 21 which extend downwardly from the side wall 22 forming the perimeter of the top wall or surface 23 of the upper jaw member of the trap. The relatively narrow end portion 24 of the upper jaw section is curved upwardly as best shown in Figures 1 and 4. These parts 24 and 18 may readily be held between the index finger and the thumb of the operator. The setting action may be accomplished by pinching together the overhung ends of the jaws, either by the fingers or by the foot when the trap is resting on a flat surface.

A pintle 25 extends through the apertured ears 20 and 21 to form a pivotal connection for the lower and upper portions of the trap. The front wall section 26 constitutes the upper biting jaw portion of the upper trap section 16. The biting jaws 19 and 26 respectively, come together to imprison the animal when the trap is sprung as best shown in Figure 5 of the drawings.

The upper trap portion 16 is provided with a number of openings and apertures to serve various purposes. The opening 27 which is a relatively large opening is best shown in Figure 2 and is formed in the top of the trap section 16 to permit plenty of light to enter the trap and also to enable the upwardly projecting bait holder to extend through the opening when the trap is closed. One of the purposes of the opening is to permit the head of the imprisoned animal to extend therethrough after it has been caught.

A second opening in the top of the trap section 16 is numbered 28 and is for the purpose of permitting the finger of the operator of the trap to enter the opening for the purpose of holding and setting the trap. A raised curved edge portion 29 serves as a thumb piece to enable the trap to be readily manipulated and more firmly held.

A pair of apertures 30, 30 also are formed in the trap section 16 by the striking out of a pair of ears 31, 31 from the top surface of the section 16. These ears extend downwardly and are apertured to receive the respective free ends of the U shaped swinging and sliding yoke or latch 32. The swinging and sliding U shaped yoke 32 has the extended end portions 33, 33 which extend through the ears 31, 31 and permit the swinging and sliding yoke to swing from the pair of ears 31, 31. The member 32 which I have designated as a yoke, acts as a prop for maintaining the upper jaw in open position and may be of any desired shape that will enable it to function in the desired manner.

It will be noted that when the trap has been set, the component of the force exerted by the spring tending to close the jaw is largely downwardly against the lower jaw, only a small portion of the force being directed against the trigger. This permits disengagement by a very slight force on the trigger.

A spring 34 is placed on the pintle 25. The spring 34, preferably has the two coil spring sections 35 and 36 with the central bearing portion 37 resting against the inner surface of the lower jaw, and the two end leg portions 38, 38 pressing against the inner surface of the upper jaw section of the trap, thereby furnishing spring action to the two jaws of the trap except when it is in released position. The lower jaw section 15, is provided with a vertically extending tongue 39.

A combined bait holder, rocking treadle and trigger generally designated 40, is disposed within the lower jaw section 15. It is a single integral member preferably constructed of a metal stamping which is preferably of a certain form and shape, which causes it to be especially sensitive and conducive to operation with unfailing speed and certainty when it is touched. The bait holder portion 41, is struck up from the section leaving the opening 42, surrounded by the relatively narrow strip like treadle sections 43 and 44, the end section 45, and the inner section 46. The bait holder portion 41, has the bait prong or tang 47 struck out from it.

The treadle end portion 45 is wider than the side sections 43 and 44, and has the projecting and pointed end portion 48, which loosely fits into the indented rocker support 49 in the biting jaw end 19 of the lower jaw section 15. The indentation 49 is deep enough and wide enough to permit the proper play of the combined bait holder, rocking treadle and trigger 40, to move up and down and to one side and to the other in the trap casing 15.

The portion of the combined bait holder and rocking treadle, opposite that which has been described, is provided with the pointed section 51 which has the side walls 52 and 53 angularly disposed one to another and forming a depression 54 which extends from the tip 55 to adjacent the vertically disposed bait holder 41. While this section of the rocking treadle has straight walls extending from the depression 54 up to the top edges of the sides 52 and 53, the portion of the rocking member at 56 is curved upwardly toward the bait holder 41 and forms the portion 46.

This portion 46 is joined with the pointed section 51 of the rocking member 40 but is separated on the sides thereof by the cut out portions 57 and 58. In the base of the depression 54, are two rectangular openings 59 and 60. The opening 59 is nearer square than the opening 60. The openings 59 and 60 are so placed that there is a cross piece or cross bar 61 formed in the depression 54. The bottoms of the curved section 56, the cross bar 61, and the bottom 62 are in alignment and extend in a plane below the plane of the portions 43, 44, 45, and 46 of the combined bait holder and rocking treadle, and supply a rounded rocking surface to enable the member 40 to rock from side to side.

When the combined bait holder and rocking treadle 40 is in place in the lower trap section 15 and the bait holder is prepared to be baited, the pointed tip 48 is in place in the indentation 49. The lower end of the swinging and sliding yoke 32 is between the combined bait holder and rocking treadle 40 and the upper inner surface of the lower jaw 15. At this time the sliding yoke 32 is capable of sliding along the inner upper surface of the jaw section 15 from substantially the front end portion 45 to its normal position in the rectangular opening 59. At this time, and in fact at all times, the struck up portion 39 extends through the rectangular slot 60 as the combined bait holder and rocking treadle 40 is rocked from side to side or is lifted upwardly. Although the treadle 40 rocks from side to side and moves upwardly with great ease, it is held in its place because of the struck up portion 39 and the projecting pointed portion 48 in the indentation 49.

It will be noted that the indentation 49 is raised in the jaw portion 19 and is away from the inner upper surface of the wall 17. This position of the indentation 49 and the upright portion 39, limits the side movement of the rocking member to some extent. When the various parts are in their assembled relation with the spring generally designated 34 in place on the pintle 25, and in proper operative position, as best shown in Figures 3 and 4, the trap is ready to be baited on the prong or tang 47.

When the animal steps on the bait treadle and touches either the portions 43, 44 or 45 with a paw or touches the bait itself on the prong 47, the combined bait holder, rocking treadle and trigger 40 is moved to one side or the other. As the treadle or trigger 40 is moved, it releases the swinging and sliding yoke or latch 32, which has been held in the rectangular opening 59 against the edge of the portion 56, and the action of the spring 34 causes the swinging and sliding U shaped yoke 32 to be released from its position against the edge of the portion 56 and to travel along the upper inner surface of the lower jaw section 15 causing the yoke or latch 32 to rapidly slide forward and cause the two jaw edges 19 and 26 to close upon the head of the animal.

The entire bait holder and rocking treadle may move upwardly and downwardly from the indentation 49, being raised by the upward movement of the upper trap section 16 through the medium of the yoke 32 which hangs therefrom and extends below the bait holder and rocking treadle 40. This raising of the holder and treadle 40 by the yoke 32 is also performed when the yoke 32 is brought back for a resetting operation when the yoke 32 is again fitted into the rectangular opening 59 to permit the prong or tang 47 to be again baited for the catching and imprisonment of another animal.

When the combined bait holder and rocking treadle 40 is moved to one side or the other or is moved upwardly, there is such a displacement of the yoke 32 with relation to the holder and treadle 40 and particularly the edge of the portion 56, that with the action of the spring 34 and the yoke 32, the two jaws of the trap close and the biting edges 19 and 26 contact.

The modified embodiment of the invention which is shown in Figures 10 to 12 inclusive of the drawings shows the lower trap section 64 and the upper trap section 65. The two trap sections are pivoted together. The lower trap section is provided with a pair of upwardly extending ears 66, 66 and the upper trap section is provided with a pair of downwardly extending ears 67, 67. A pintle 68 extends through apertures which are in the two pairs of ears. A coil spring 69 having its ends 70 and 71 is placed on the pintle. This spring furnishes action to the upper and lower trap jaws.

The lower trap section 64 at its perimeter is provided with the wall 72 and has the biting or imprisoning edge 73. The lower jaw section 64 is also provided with a pair of upturned ears 74, 74. These ears are struck up out of the wall of the lower jaw 64 and are along the side of a relatively large opening 75 which permits the movement and play upwardly and downwardly of the bait prong or tang 76 of the bait holder 77.

Each of the upstanding ears 74, 74 is perforated to receive the outwardly extending ends 78, 78 of the U shaped yoke or latch 79. The U shaped yoke 79 is constructed like the U shaped yoke in the preferred embodiment of the invention shown in Figures 1 to 6 inclusive, of the drawings, but extends upwardly from the lower trap portion 64 to the upper trap portion 65, whereas in the preferred form, the U shaped yoke 32 is suspended from the upper trap section 16 and swings and slides on the lower trap section 15.

The upper trap section of the modified construction has the side wall 80 on the perimeter of the jaw section 65 and has the downwardly extending biting and imprisoning edge 81. The wall of the top section 65 is provided with a curved portion 82 to furnish with the lower extending portion 83, clasping means for holding the trap when setting the same. These parts 82 and 83 may readily be held between the index finger and the thumb of the operator.

The top jaw portion of the trap is provided with an elongated aperture 84, having downwardly extending runway portions 85, 85 formed at the side edges of the opening 84. These longitudinally extending runway portions 85, 85 which extend downwardly at right angles to the top wall of the jaw section 65 having the slots 89 therein are separated far enough from each other to permit the swinging bait holder 77, to swing freely between them and in the elongated aperture 84. The movable bait holder 77 is provided with a number of angular turns 86, 86, 86, the end portion extending through the aperture 87 in the top of the wall of the jaw portion 65. The end of the bait holder 77 is loosely held in the aperture 87. The bait holder 77 is also provided with the indented stud 88, against which the U shaped yoke 79 rests when the trap is set and awaiting release.

The bait holder 77 is held so loosely in the opening 84, and is held so loosely by the end portion in the aperture 87, that it may be readily moved up or down and from one side to the other, that on the slightest touch after being set in position and under the tension of the spring 69, the trap will be sprung and the animal will be caught and imprisoned between the biting jaw ends 73 and 81. In other words, when the animal touches the bait on the prong or tang 76 of the bait holder 77, the up and down movement, or the movement from one side to the other of the bait holder, releases the U shaped yoke 79 from the stud 88 and the spring 69 causes the yoke to swing and quickly slide forwardly in the two passageways 89, 89 and between the runways 85, 85, whereupon the two jaws of the trap will be instantaneously closed upon the head of the animal.

It will thus be seen that in both forms of trap described above and illustrated in the drawings, there is in each structure a pair of metallic jaws, which are brought together through the action of a coil spring and through the medium of a U shaped yoke or latch which extends from one of the jaws, swings, and slides along the other jaw after it has been released by the action of the animal on the bait holding mechanism. In each case, the bait holding mechanism which may move up or down or from one side to the other releases the swinging and sliding yoke so that the tension of the spring causes the upper and lower jaws in each case to close and catch and imprison the animal.

In one case, the swinging and sliding yoke is suspended from the top jaw portion of the trap, hangs downwardly and slides along the bottom portion of the trap. In the other case, the swinging and sliding yolk extends toward the top portion of the trap and swings and slides against the upper portion of the trap. In both cases, the bait holder is loosely adusted and hung in its place one against the bottom portion of the trap, the other against the upper portion of the trap.

Having thus described our invention, what we claim and desire to secure by Letters Patent is:

1. In an animal trap, the combination of two jaws, said jaws being pivotally secured to each other by means of a pivot pin, a coil spring on said pivot pin, a yoke swingingly secured to one jaw and extending to the other jaw, and a bait holder, said bait holder and said spring operating to cause said yoke to release one jaw so that said jaw may contact with the other of said jaws, said bait holder being movable up and down and also from one side to another.

2. In an animal trap, the combination of two jaws, said jaws being pivotally secured to each other by means of a pivot pin, a coil spring on said pivot pin, a yoke swingingly secured to one jaw and extending to the other jaw, a bait holder, said bait holder and said spring operating to cause said yoke to release one jaw so that said jaw may contact with the other of said jaws, said bait holder being movable up and down and also from one side to another, and means associated with one of said jaws, for furnishing a runway or guideway for said yoke as said yoke slides toward the front portion of the biting jaw portion of the trap.

3. In an animal trap, a lower jaw member and an upper jaw member, said jaw members being pivotally secured to each other by means of a pivot pin, a coil spring on said pivot pin, said coil spring causing tension between the two jaws, a combined bait holder, treadle and trigger loosely secured in said lower jaw member and a yoke or latch suspended from said upper jaw member, said combined bait holder, treadle and trigger being provided with means in association with said yoke, whereby said jaws may be held apart until movement of said bait holder, treadle and trigger, said combined bait holder, treadle and trigger being formed with upturned sides so that it may rock from side to side and cause its release to close said trap jaws.

4. In an animal trap, a lower jaw member and an upper jaw member, said jaw members being pivotally secured to each other by means of a pivot pin, a coil spring on said pivot pin, said coil spring causing tension between the two jaws, a combined bait holder, treadle and trigger loosely secured in said lower jaw member and a yoke or latch suspended from said upper jaw member, said combined bait holder, treadle and trigger being provided with means in association with said yoke, whereby said jaws may be held apart until movement of said bait holder, treadle and trigger, said combined bait holder, treadle and trigger being formed at one end thereof with upturned sides and at the other end with means cooperating with the end of said lower jaw so that the combined bait holder, treadle and trigger may rock from side to side and cause its release to close said trap jaws.

5. In an animal trap, jaw members pivotally secured to each other by means of a pivot pin, a coil spring on said pivot pin, a combined bait holder, treadle and trigger secured to one of said jaw members and a yoke suspended from the other of said jaw members, means connected with an end of said last mentioned jaw member so that the combined bait holder, treadle and trigger may rock from side to side and cause its release to close said jaws, said means consisting of an indentation in the front wall portion of said jaw and a pointed extension of said treadle, said pointed extension extending into said indentation, said treadle having a portion cut out therefrom and extending upwardly and formed as a bait holder prong, said bait holder prong extending transversely to said treadle portion.

6. In an animal trap, a lower jaw and an upper jaw member, said jaw members being pivotally secured to each other by means of a pivot pin, a coil spring on said pivot pin, a combined bait holder, treadle and trigger loosely secured in said lower jaw member and a yoke suspended from said upper jaw member, said treadle being provided with two openings, one of said openings to receive an upwardly extending portion of said lower jaw member, and the other of said openings to receive the transversely extending portion of said yoke, said openings permitting sidewise motion of said trigger in two directions, up and down motion to enable the yoke to be released and rocking motion so the jaws of the trap may contact and close.

7. In an animal trap, a lower jaw member and an upper jaw member, said jaw members being pivotally secured to each other by means of a pivot pin, a coil spring on said pivot pin, a combined bait holder, treadle and trigger loosely secured in said lower jaw member and a yoke suspended from said upper jaw member, said treadle being provided with three openings, one of said openings to receive an upwardly extending portion of said lower jaw member, the second of said openings to receive the transversely extending portion of said yoke, said openings permitting sidewise motion of said trigger in two directions, an up and down motion to enable the yoke to be released and rocking motion so the jaws of the trap may contact and close, and a third opening caused by the formation of the upright bait holder, longitudinal strips alongside said last mentioned opening, which said longitudinal strips furnish treadle means to cause rocking motion of said treadle, causing release of said yoke, to cause contacting of said trap jaws.

8. In an animal trap, a lower jaw member and an upper jaw member, said jaw members being pivotally secured to each other by means of a pivot pin, a coil spring on said pivot pin, a combined bait holder, treadle and trigger loosely secured in said lower jaw member and a yoke suspended from said upper jaw member, said treadle being provided with three openings, one of said openings to receive an upwardly extending portion of said lower jaw member, the second of said openings to receive the transversely extending portion of said yoke, said openings permitting sidewise motion of said trigger in two directions, an up and down motion to enable the yoke to be released and rocking motion so the jaws of the trap may contact and close, and a third opening caused by the formation of the upright bait holder, longitudinal strips alongside said last mentioned opening, which said longitudinal strips furnish treadle means to cause rocking motion of said treadle, causing release of said yoke, to cause contacting of said trap jaws, and also to cause the transverse portion of said yoke after said release to slide between said longitudinally extending side portions and the top surface of said bottom jaw portion of said trap.

9. In an animal trap, a lower jaw member and an upper jaw member, said jaw members being pivotally secured to each other by means of a pivot pin, a coil spring on said pivot pin, a combined bait holder, treadle and trigger loosely secured in said lower jaw member and a yoke suspended from said upper jaw member, said treadle being provided with three openings, one of said openings to receive an upwardly extending portion of said lower jaw member, the second of said openings to receive the transversely extending portion of said yoke, said openings permitting sidewise motion of said trigger in two directions, an up and down motion to enable the yoke to be released and rocking motion so the jaws of the trap may contact and close, and a third opening caused by the formation of the upright bait holder, longitudinal strips alongside said last mentioned opening, which said longitudinal strips furnish treadle means to cause rocking motion of said treadle, causing release of said yoke, to cause contacting of said trap jaws, and also to cause the transverse portion of said yoke after said release to slide between said longitudinally extending side portions and the top surface of said lower jaw member of said trap, the walls of said combined bait holder, treadle and trigger being angularly disposed, said first two mentioned openings being at the base of said walls and the punctured portion of said combined bait holder, treadle and trigger between the angular wall portion and the longitudinal side wall portion forming a stop on the under surface of said combined bait holder, treadle and trigger, said yoke contacting said stop until release by movement of said combined bait holder, treadle and trigger.

10. In an animal trap, a lower jaw member and an upper jaw member, said jaw members being pivotally secured to each other by means of a pivot pin, a coil spring on said pivot pin, said coil spring causing tension between the two jaws, an elongated opening in the upper jaw member, turned down runway portions along each side edge of said elongated opening, said turned down portions being formed with elongated openings, a bait holder, said bait holder hanging loosely in said first mentioned opening, a U shaped yoke having its ends secured in said lower jaw member, the transverse part of the yoke being slidably arranged in the pair of elongated openings in said downwardly extending portions in said top jaw of said trap.

11. In an animal trap, a lower jaw member and an upper jaw member, said jaw members being pivotally secured to each other by means of a pivot pin, a coil spring on said pivot pin, said coil spring causing tension between the two jaws, an elongated opening in the upper jaw member, turned down runway portions along each side edge of said elongated opening, said turned down portions being formed with elongated openings, a bait holder, said bait holder hanging loosely in said first mentioned opening, a U shaped yoke having its ends secured in said lower jaw member, the transverse part of the yoke being slidably arranged in the pair of elongated openings in said downwardly extending portions in said top jaw of said trap, said movable bait holder being narrower than said opening in which it hangs and said bait holder being adapted to swing up and down and to rock from side to side and when released, causing said yoke to slide in said elongated openings in said downwardly extending guide portions.

12. In an animal trap, a lower jaw member and an upper jaw member, said jaw members being pivotally secured to each other by means of a pivot pin, a coil spring on said pivot pin, said coil spring causing tension between the two jaws, an elongated opening in the upper jaw member, turned down runway portions along each side edge of said elongated opening, said turned down portions being formed with elongated openings, a bait holder, said bait holder hanging loosely in said first mentioned opening, a U shaped yoke having its ends secured in said lower jaw member, the transverse part of the yoke being slidably arranged in the pair of elongated openings in said downwardly extending portions in said top jaw of said trap, said movable bait holder being narrower than said opening in which it hangs and said bait holder being adapted to swing up and down and to rock from side to side and when released, causing said yoke to slide in said elongated openings in said downwardly extending guide portions, said bait holder having a stud which cooperates with the transverse portion of said U shaped yoke, said U shaped yoke contacting with said stud to hold said trap in set condition and being released when said bait holder is moved, causing said yoke to be released from said stud and to slide in said elongated openings along said elongated guideways to close the jaws of the trap.

13. In an animal trap, the combination of two pivotally joined jaw members, one of which comprises a lever of the first order, whereby means are provided for opening the jaws by pinching together portions of the trap opposite to the jaw-engagement portions, spring means tending to close said jaws, a prop mounted for swinging movement on one of said jaw members, the complementary jaw member providing a slideway for the free end of said prop, and a bait holder and trigger mounted for rocking movement and overlying said slideway, said trigger providing a notch for engagement by the free end of said prop, the trap being set by pinching together the overhanging ends, thereby causing the prop to travel in said slideway until opposite the notch in the trigger, said trap being adapted to be sprung by oscillation of the trigger either due to lateral movement of the bait holder or by the weight of an animal applied to one side of said trigger.

14. In an animal trap, the combination of two pivotally joined jaw members, one of which comprises a lever of the first order whereby means are provided for setting the trap by pinching together portions of the trap opposite to the jaw engagement portions, spring means tending to close said jaws, a prop mounted for swinging movement on one of said jaw members, the complementary jaw member providing a slideway for the free end of said prop, and a bait holder and trigger mounted for rocking movement and overlying said slideway, said trigger providing a notch for engagement by the free end of said prop, the trap being set by pinching together the overhanging ends, thereby causing the prop to travel in said slideway until opposite the notch in the trigger, the arrangement being such that a substantial component of the force exerted by the spring on said prop tending to close said jaws is directed downwardly against the jaw rather than against said trigger.

15. In an animal trap, the combination of two pivotally joined jaw members, one of which comprises a lever of the first order whereby means are provided for opening the jaws by pinching together portions of the trap opposite to the jaw engagement portions, spring means tending to close said jaws, a prop mounted for swinging movement on one of said jaw members, the complementary jaw member providing a slideway for the free end of said prop, and a bait holder and trigger providing a notch for engagement by the free end of said prop, the trap being set by pinching together the overhanging ends, thereby causing the prop to travel in said slideway until opposite the notch in the trigger, the bait holder projecting vertically and said movable jaw portion having an opening through which the bait holder is accessible with the jaws in sprung position whereby the trap may be baited when the trap is sprung and thereafter set by the sole act of pinching together the overhung ends.

16. In an animal trap, the combination of upper and lower jaw members pivoted together at a point between their ends, spring means tending to close the jaws, a prop mounted for swinging movement on the upper jaw member at a point forward of its pivot, the lower jaw member providing a slideway for the free end of said prop, a gravity-acting trigger having a bait holder projecting vertically therefrom, said trigger being mounted for transverse rocking movement and overlying said slideway and providing a notch for engagement by the prop, said prop being disengaged to permit the trap to be sprung by lateral rocking movement of said trigger and bait holder.

HENRY J. HOUTSINGER.
HERBERT A. STILSON.